(12) United States Patent   (10) Patent No.: US 8,477,227 B2
Hio                        (45) Date of Patent:     Jul. 2, 2013

(54) MONITORING AND COMMUNICATION IN A SYSTEM HAVING MULTIPLE IMAGING APPARATUSES

(75) Inventor: Akimitsu Hio, Tokyo (JP)

(73) Assignee: Sony Corporation (JP)

( * ) Notice: Subject to any disclaimer, the term of this patent is extended or adjusted under 35 U.S.C. 154(b) by 663 days.

(21) Appl. No.: 12/290,170

(22) Filed: Oct. 28, 2008

(65) Prior Publication Data

US 2009/0115854 A1    May 7, 2009

(30) Foreign Application Priority Data

Nov. 2, 2007  (JP) ................................ P2007-286756

(51) Int. Cl.
    *H04N 5/222* (2006.01)
(52) U.S. Cl.
    USPC .................. 348/333.01; 348/143; 348/211.3; 348/211.8; 348/211.11
(58) Field of Classification Search
    USPC ................... 348/211.11, 218.1, 333.01, 143, 348/333.05
    See application file for complete search history.

(56) References Cited

U.S. PATENT DOCUMENTS

| 6,580,451 | B2 * | 6/2003 | Yonezawa et al. | 348/159 |
| 7,746,380 | B2 * | 6/2010 | Maruya et al. | 348/169 |
| 2001/0015759 | A1 | 8/2001 | Squibbs | |
| 2002/0049979 | A1 * | 4/2002 | White et al. | 725/87 |
| 2002/0113872 | A1 * | 8/2002 | Kinjo | 348/116 |
| 2004/0145663 | A1 | 7/2004 | Nishio et al. | |
| 2005/0193421 | A1 * | 9/2005 | Cragun | 725/80 |
| 2006/0158534 | A1 * | 7/2006 | Gotohda | 348/239 |
| 2006/0187317 | A1 | 8/2006 | Montulli et al. | |
| 2006/0280496 | A1 | 12/2006 | Tanoue | |
| 2007/0070186 | A1 * | 3/2007 | Fujimori et al. | 348/14.03 |
| 2007/0083329 | A1 * | 4/2007 | Im | 702/5 |
| 2007/0126627 | A1 | 6/2007 | Ueno et al. | |
| 2007/0198182 | A1 * | 8/2007 | Singh | 701/211 |
| 2008/0098068 | A1 * | 4/2008 | Ebata | 709/206 |
| 2009/0027495 | A1 * | 1/2009 | Oskin et al. | 348/143 |
| 2011/0166777 | A1 * | 7/2011 | Chavakula | 701/201 |
| 2012/0019522 | A1 * | 1/2012 | Lawrence et al. | 345/419 |
| 2012/0162252 | A1 * | 6/2012 | Endo | 345/629 |

FOREIGN PATENT DOCUMENTS

| JP | 08154197 A | 6/1996 |
| JP | 09233463 A | 9/1997 |
| JP | 2002-236651 A | 8/2002 |

(Continued)

OTHER PUBLICATIONS

Offce Action from Japanese Application No. 2007-286756, dated Jan. 10, 2012.

(Continued)

*Primary Examiner* — Jason Chan
*Assistant Examiner* — Cynthia Segura
(74) *Attorney, Agent, or Firm* — Lerner, David, Littenberg, Krumholz & Mentlik, LLP

(57) ABSTRACT

Disclosed herein is an information display apparatus including a wireless reception section configured to receive image data and position information acquired and sent by a plurality of imaging apparatuses constituting a wireless network; an image display section configured to display images; and a display control section configured to display on the image display section thumbnails derived from the acquired image data received by the wireless reception section, a map covering the positions of the imaging apparatuses, and icons indicating the imaging apparatuses as they are positioned on the map based on the position information received by the wireless reception section.

11 Claims, 17 Drawing Sheets

| FOREIGN PATENT DOCUMENTS | | |
|---|---|---|
| JP | 2004048560 A * | 2/2004 |
| JP | 2005-020385 A | 1/2005 |
| JP | 2005291981 A | 10/2005 |
| JP | 2005295447 A | 10/2005 |
| JP | 2006254414 A | 9/2006 |
| JP | 2006-311301 A | 11/2006 |
| WO | WO 2004114712 A1 * | 12/2004 |

OTHER PUBLICATIONS

European Search Report EP Application No. 08167781, dated Oct. 4, 2012.

* cited by examiner

MONITORING AND COMMUNICATION IN A SYSTEM HAVING MULTIPLE IMAGING APPARATUSES

CROSS REFERENCES TO RELATED APPLICATIONS

The present application claims priority from Japanese Patent Application No. JP 2007-286756, filed in the Japanese Patent Office on Nov. 2, 2007, the entire content of which is incorporated herein by reference.

BACKGROUND OF THE INVENTION

1. Field of the Invention

The present invention relates to an information display apparatus, an information display method, an imaging apparatus, and an image data sending method for use with the imaging apparatus.

More particularly, the invention relates to an information display apparatus for receiving image data and position information acquired and sent by imaging apparatuses constituting a wireless network, the information display apparatus including an image display section which displays thumbnails of the acquired image data, a map covering the positions of the imaging apparatuses based on imaging apparatus position information, and icons indicating the imaging apparatuses as they are positioned on the map, in such a manner that a director operating the information display apparatus can easily verify the positions of the imaging apparatuses on the network and the images being taken thereby.

The invention further relates in particular to an imaging apparatus for acquiring image data and own position information by measuring its own position, the imaging apparatus sending the acquired own position information paired with the acquired image data onto a wireless network so that a director operating an information display apparatus connected to the network can easily verify the position of the imaging apparatus and the image data acquired thereby.

2. Description of the Related Art

There are cases in which a plurality of cameras (i.e., imaging apparatuses) are used for covering a single event in the field. In such cases, the angles and other settings of the cameras are determined during shooting by the persons operating the cameras based more or less on their experience and intuition. Although mobile phones and/or walkie-talkies have been used for coordination between them, the camera operators have mostly found it difficult to know the position of each camera on site and the image being taken thereby.

Illustratively, Japanese Patent Laid-Open No. 2006-311301 discloses a multi-hop communication system that performs multi-hop communication using a wireless ad-hoc network. Putting the disclosed multi-hop communication system to use apparently makes it possible to send materials acquired by a camera on the network to a broadcasting station while bypassing obstructions in a line-of-sight path to the station.

As another example, U.S. Published Application No. 2006/0280496 discloses an imaging apparatus devised so that a plurality of such imaging apparatuses exchange image data by wireless communication therebetween. The wireless communication apparently allows the user operating each of these imaging apparatuses easily to verify the images being taken by the other imaging apparatuses and to record these images as desired.

SUMMARY OF THE INVENTION

As mentioned above, where a plurality of cameras (imaging apparatuses) are used for coverage of a single event, it is generally difficult to know the positions of the cameras involved and the images being acquired thereby. According to the techniques disclosed by U.S. Published Application No. 2006/0280496, the images being taken by the configured cameras can be verified but the camera positions remain unknown to their operators.

The embodiments of the present invention has been made in view of the above circumstances and provides arrangements such that a director can easily verify the positions of a plurality of imaging apparatuses constituting a wireless network and the images being acquired by such imaging apparatuses.

In carrying out the present invention and according to one embodiment thereof, there is provided an information display apparatus including: a wireless reception section configured to receive image data and position information acquired and sent by a plurality of imaging apparatuses constituting a wireless network; an image display section configured to display images; and a display control section configured to display on the image display section thumbnails derived from the acquired image data received by the wireless reception section, a map covering the positions of the imaging apparatuses, and icons indicating the imaging apparatuses as they are positioned on the map based on the position information received by the wireless reception section.

According to the above embodiment, the wireless reception section receives acquired image data and position data from the imaging apparatuses (i.e., cameras) making up the wireless network. The image display section displays thumbnails for verifying the images represented by the acquired image data. Because the image display section need merely display thumbnails, the acquired image data received from the imaging apparatuses may be low-bit-rate image data of a low resolution and a low frame rate.

The image display section also displays a map covering the positions of the imaging apparatuses. Based on the position information received from the imaging apparatuses, the image display section displays icons indicating the imaging apparatuses as they are positioned on the map.

As outlined above, the image display section displays the thumbnails derived from the image data acquired by the imaging apparatuses, along with the icons indicating the corresponding positions of the imaging apparatuses on the map. This structure allows the director operating the information display apparatus easily to verify the positions of the imaging apparatuses and the images being taken thereby.

Preferably, from a database constituting part of the wireless network, the wireless reception section may receive map data covering the position indicated by the position information acquired by a positioning section. The display control section may then display a map on the image display section based on the map data received by the wireless reception section. In this case, the map data covering solely the positions of the imaging apparatuses need merely be stored. There is no need to keep superfluous map data in storage, which translates into memory savings.

Preferably, if the number of imaging apparatuses constituting the wireless network is larger than the number of thumbnail display fields on the image display section, then the display control section may cause the thumbnail display fields to display the thumbnails corresponding to the imaging apparatuses selected by a user (i.e., director). For example, if the information display apparatus is constituted by an imaging apparatus, then the image display section such as an LCD (liquid crystal display) has merely a narrow display area accommodating a limited number of thumbnail display fields. In such a case, each thumbnail display field may be arranged to display the thumbnail corresponding to the imaging apparatus selected by the user (director). This arrangement makes it possible to handle the situation where the number of imaging apparatus exceeds that of the thumbnail display fields available.

Preferably, the display control section may be arranged to display, in positions corresponding to the thumbnail display fields on the image display section, the same icons as those displayed on the map and indicative of the imaging apparatuses associated with the thumbnails indicated in the thumbnail display fields. This arrangement makes it possible clearly to determine the correspondence between the thumbnail displayed in each thumbnail display field and the imaging apparatus which has taken the thumbnail in question and of which the position is being indicated on the map. The arrangement is particularly effective where the number of thumbnail display fields is smaller than that of imaging apparatus so that each thumbnail display field is set to display the thumbnail corresponding to the imaging apparatus selected by the user (director).

Preferably, the information display apparatus according to the embodiments of the present invention may further include a message input section configured to allow the user to input a directive message; a transmission destination selection section configured to allow the user to select one of the imaging apparatuses as the destination to which to send the directive message; and a wireless transmission section configured to send the directive message input through the message input section to the imaging apparatus selected by the transmission destination selection section. This structure permits better coordination between the imaging apparatuses (cameras), thereby eliminating the need for the user to resort to mobile phones, walkie-talkies or the like.

According to another embodiment of the present invention, there is provided an imaging apparatus for constituting part of a wireless network, the imaging apparatus including an imaging section configured to image objects and acquire image data corresponding to the objects; a positioning section configured to acquire position information by measuring the own position of the imaging apparatus; and a wireless transmission section configured to send onto the wireless network the image data acquired by the imaging section in association with the position information acquired by the positioning section.

Where the above embodiment is in use, the positioning section of the imaging apparatus acquires position information by measuring the own position of the apparatus. The positioning section is typically composed of a GPS (global positioning system) module. The wireless transmission section of the imaging apparatus sends onto the wireless network the image data acquired by the imaging section in combination with the position information obtained by the positioning section.

On an information display apparatus connected to the wireless network in the above setup, the image display section displays thumbnails derived from the image data acquired by each of the imaging apparatuses, together with icons indicating the imaging apparatuses as they are positioned on the map being displayed. The director operating the information display apparatus is thus able to know easily the positions of the imaging apparatus configured on the map and the images being taken by these apparatuses.

According to the embodiments of the present invention, as outlined above, image data and position information are received after being acquired and sent by a plurality of imaging apparatuses constituting a wireless network. On an image display section, thumbnails derived from the acquired image data are displayed along with a map covering the positions of the imaging apparatuses and icons indicating the imaging apparatuses as they are positioned on the map based on the received position information. The director (user) is then able to know easily the positions of the imaging apparatuses making up the wireless network as well as the images being taken by these apparatuses.

Also according to the embodiments of the present invention, position information is acquired by measuring the own position of the imaging apparatus. The position data thus acquired is sent onto the wireless network in association with the image data obtained. The director operating the information display apparatus connected to the wireless network may then recognize easily the positions of the configured imaging apparatuses and the images being acquired thereby.

DETAILED DESCRIPTION OF THE PREFERRED EMBODIMENTS

The preferred embodiments of the present invention will now be described in reference to the accompanying drawings.

Figure 1:
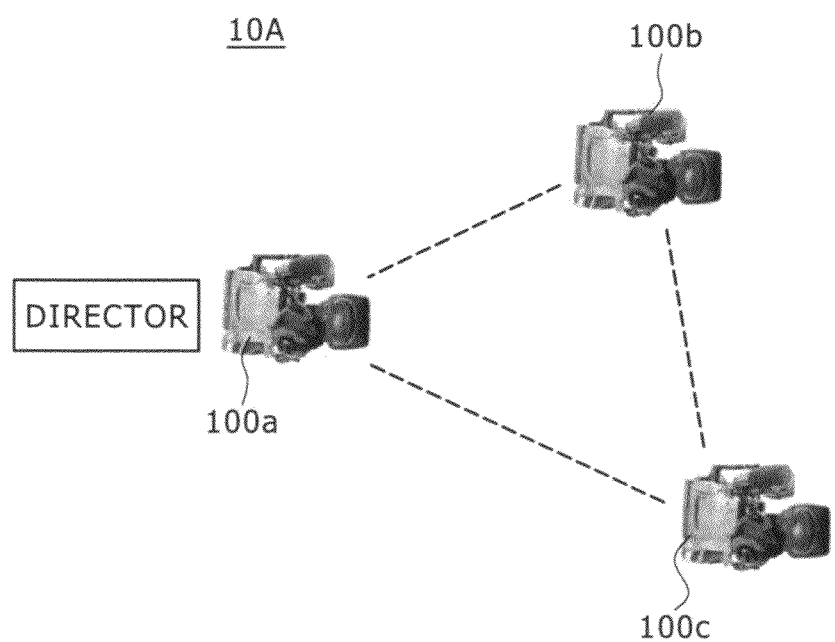
FIG. 1 is a schematic view showing a typical configuration of a camera system practiced as one embodiment of the present invention.

FIG. 1 schematically shows a typical configuration of a camera system 10A practiced as one embodiment of the present invention. The camera system 10A is made up of three cameras (i.e., imaging apparatuses) 100a, 100b and 100c which are interconnected on a wireless ad-hoc network.

Figure 2:
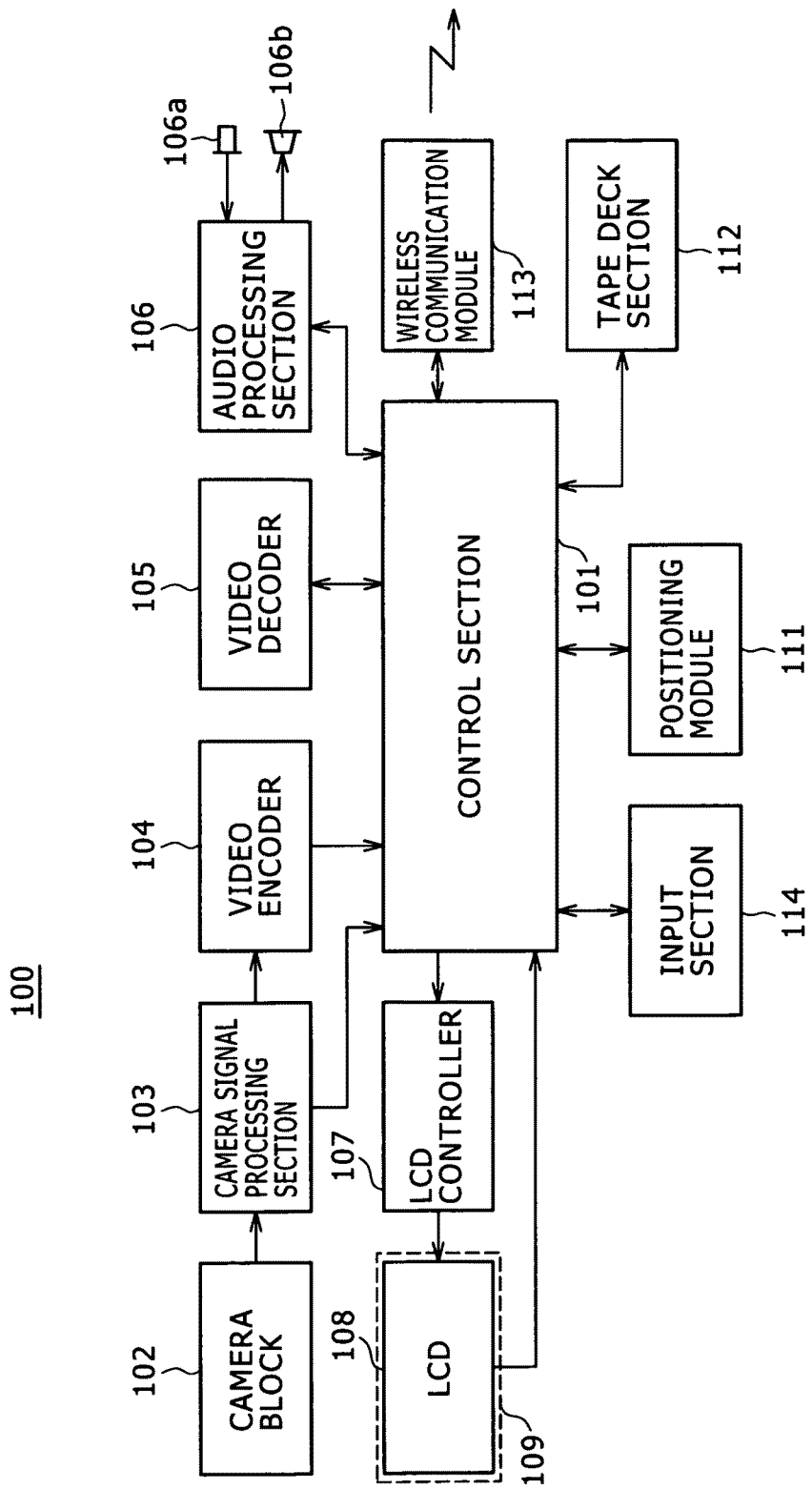
FIG. 2 is a block diagram showing a typical structure of a camera.

FIG. 2 is a block diagram showing a typical structure of one camera 100 (100a, 100b, 100c). The camera 100 includes a control section 101, a camera block 102, a camera signal processing section 103, a video encoder 104, a video decoder 105, an audio processing section 106, an LCD controller 107, an LCD 108, a touch-sensitive panel 109, an input section 114, a positioning module 111, a tape deck section 112, and a wireless communication module 113.

The control section 101 controls the camera 100 as a whole. Although not shown, the control section 101 is typically made up of a CPU (central processing unit), a RAM (random access memory) and a ROM (read only memory) interconnected via a system bus. The control section 101 controls the components of the camera 100 by getting its CPU to execute preinstalled programs in the ROM such as a flash EEPROM (electrically erasable programmable ROM). The RAM such as a DRAM (dynamic RAM) is used primarily as a work area for the CPU, the RAM temporarily accommodating half-way results of arithmetic operations during processing.

The camera block 102 is constituted by an optical block including a plurality of lenses, an imaging device such as CMOS (complementary metal oxide semiconductor) or CCD (charge coupled device), a preprocessing circuit, drivers for driving the optical block and imaging device, and a timing generator. In operation, the camera block 102 causes its imaging device to subject the light entering the optical block to photoelectric conversion and has its preprocessing circuit carry out sample-and-hold operations, AGC (auto gain control) and A/D conversion before outputting image data in digital form. The optical block and imaging device in operation are controlled by control signals from the control section 101.

The camera signal processing section 103 subjects the image data coming from the camera block 102 to camera signal processing such as AWB (auto white balance) control, AF (auto focus) control and AE (Auto exposure) control. The camera signal processing section 103 supplies the image data thus processed to the video encoder 104 and control section 101.

The video encoder 104 compression-encodes the image data having undergone the camera signal processing using a predetermined moving image data format such as the MPEG (Moving Picture Experts Group) standard, and sends the encoded image data to the control section 101. The video decoder 105 receives encoded image data from the control section 101, expansion-decodes the received data, and feeds the decoded image data to the control section 101.

The audio processing section 106 typically includes an amplifier, an A/D converter, a D/A converter, and a processing circuit for compression-encode and expansion-decode processing. The audio processing section 106 is connected with a microphone 106a and speakers 106b. An audio signal picked up by the microphone 106a is amplified, digitized, and compression-encoded by the audio processing section 106 using a suitable audio data format such as MPEG-AUDIO. The audio signal thus encoded is forwarded to the control section 101.

Alternatively, an external input terminal for admitting analog audio signals may be installed. In this case, an audio signal input through the external input terminal may be compression-encoded by the audio processing section 106 before being fed to the control section 101. An encoded audio signal from the control section 101 is expansion-decoded, converted to analog form, amplified, and output through the speakers 106b.

From the image data supplied by the control section 101, the LCD controller 107 generates an image signal ready for display on the LCD 108, and sends the image signal to the LCD 108 for image display. The touch-sensitive panel mounted on the LCD 108 allows the user to click on the screen using fingertips, a stylus or the like for input operations. The input section 114 is typically made up of buttons, levers and dials. When input operations are performed on the touch-sensitive panel 109 or on the input section 114, operation signals reflecting the performed operations are forwarded from there to the control section 101.

The positioning module 111 is illustratively composed of a GPS module. Based on information sent from GPS satellites, the GPS module can obtain position information of its own position (in longitude and latitude). The position information thus acquired is forwarded to the control section 101.

The tape deck section 112 is removably equipped with a video cassette (not shown) containing a magnetic tape as a recording medium for recording image and audio data. The tape deck section 112 modulates the image and audio data coming from the control section 101 and writes the modulated data to the magnetic tape. The tape deck section 112 further demodulates signals read from the magnetic tape and sends the demodulated signals to the control section 101.

The wireless communication module 113 is typically constituted by an antenna and an RF transceiver for signal transmission and reception using a modulation method such as OFDM (Orthogonal Frequency Division Multiplexing), as well as by processors for handling baseband processing and for interfacing with the control section 101. Under a communication protocol controlled by the control section 101, the wireless communication module 113 communicates wirelessly with the other cameras configured. The wireless communication standard to be used may illustratively be IEEE (Institute of Electrical and Electronic Engineers) 802.11g for wireless LANs.

The basic workings of the camera 100 in FIG. 2 are explained below.

First, acquired image data is recorded as follows: prior to the recording process, the light from objects is subjected to photoelectrical conversion by the imaging device of the camera block 102 for preprocessing and digitization. The image data thus digitized is input to the camera signal processing section 103. The image data having undergone the camera signal processing is input to the LCD controller 107 via the control section 101. These steps allow the LCD 108 to display what is known as a camera-through image.

Where the above state is in effect, an operation input may be effected to the input section 114 for image recording. In that case, the acquired image data is forwarded from the camera signal processing section 103 to the video encoder 104. In turn, the video encoder 104 compression-encodes the image data into data in a predetermined moving image format. The encoded image data is input as a video stream to the control section 101. Meanwhile, the audio signal picked up by the microphone 106a is compression-encoded by the audio processing section 106 into data in a predetermined audio format. The encoded audio signal is input as an audio stream to the control section 101. The video stream and audio stream are multiplexed by the control section 101 for output to the tape deck section 112. The audio and video streams are suitably modulated by the tape deck section 112 before being recorded successively to the magnetic tape in the video cassette.

The data recorded on the video cassette is reproduced as follows: the data retrieved from the video cassette by the tape deck section 112 is separated by the control section 101 into a video stream and an audio stream. The video stream is expansion-decoded by the video decoder 105 before being input to the LCD controller 107 via the control section 101. In turn, the LCD controller 107 causes the LCD 108 to display reproduced images. Meanwhile, the audio stream is expansion-decoded by the audio processing section 106 and output through the speakers 106b as reproduced sounds.

Described below is how the camera 100 of FIG. 2 sends acquired image data to other cameras for image verification, how thumbnails based on the acquired image data received from other cameras are displayed by the camera 100, and how a directive message is sent from the camera 100 to another camera.

Acquired image data is sent from the camera 100 to other cameras as follows.

The acquired image data is first supplied from the camera signal processing section 103 to the video encoder 104. The video encoder 104 turns the image data into low-bit-rate data and compression-encodes the data for conversion to data in a predetermined moving image format. The resulting image data is input as an outgoing bit stream to the control section 101. Turning given data into low-bit-rate data involves reducing the resolution of the data in question or lowering both the resolution and the frame rate of the data.

The control section 101 supplements the outgoing bit stream coming from the video encoder 104 with position information acquired by the positioning module 111 as indicative of the own position of the camera 100. The outgoing bit stream furnished with the position information is forwarded from the control section 101 to the wireless communication module 113 before being output onto the wireless network according to a predetermined communication protocol. The outgoing bit stream placed onto the wireless network is further supplemented by an ID (identification) of the camera 100 acting as a wireless node.

Described next is how a thumbnail based on the acquired image data received from another camera is displayed by the camera 100.

An outgoing bit stream supplemented with the position information of another camera and output thereby onto the wireless network is received by the wireless communication module 113. The bit stream is forwarded from the wireless communication module 113 to the control section 101. The control section 101 separates the bit stream from the position information attached thereto. The separated bit stream is expansion-decoded by the video decoder 105, and the decoded image data is supplied to the control section 101 as thumbnail display data. Through such processing, the control section 101 is fed with the thumbnail display data corresponding each of the other cameras connected to the wireless network.

The outgoing bit stream obtained by the video encoder 104 is fed to the video decoder 105 through the control section 101. The bit stream is expansion-decoded by the video decoder 105, and the decoded image data is sent to the control section 101 as thumbnail display data corresponding to the own camera.

Based on the position information acquired by the positioning module 111, the control section 101 reads from the ROM the map data covering illustratively the neighborhood of the own camera 100 (as well as the other cameras making up the wireless network). The control section 101 then derives map display data from the retrieved map data. Given the position information separated from the outgoing bit stream and the position information acquired by the positioning module 111, the control section 101 further generates icon display data constituting icons indicative of the configured cameras in their positions defined by their position information on the map derived from the map display data.

A directive message sent by another camera onto the wireless network is received by the wireless communication module 113 and fed to the control section 101. If the directive message is found to be destined for the own camera 100, the control section 101 generates message display data (i.e., text data) representing the directive message to be displayed.

The control section 101 proceeds to synthesize the thumbnail display data, map display data, icon display data, and message display data into composite image data. The composite image data is forwarded from the control section 101 to the LCD controller 107 which in turn causes the LCD 108 to display the image based on the composite image data. In this case, the LCD 108 displays thumbnails of the image data acquired by the configured cameras, the map covering the neighborhood of the cameras, and the directive message.

Described next is how a directive massage is sent to other cameras.

A directive message is input by the user (i.e., director) operating the input section 114. The directive message is then forwarded from the input section 114 to the wireless communication module 113 by way of the control section 101. From the wireless communication module 113, the directive message is transmitted to the camera selected by the user (director).

Figure 3:
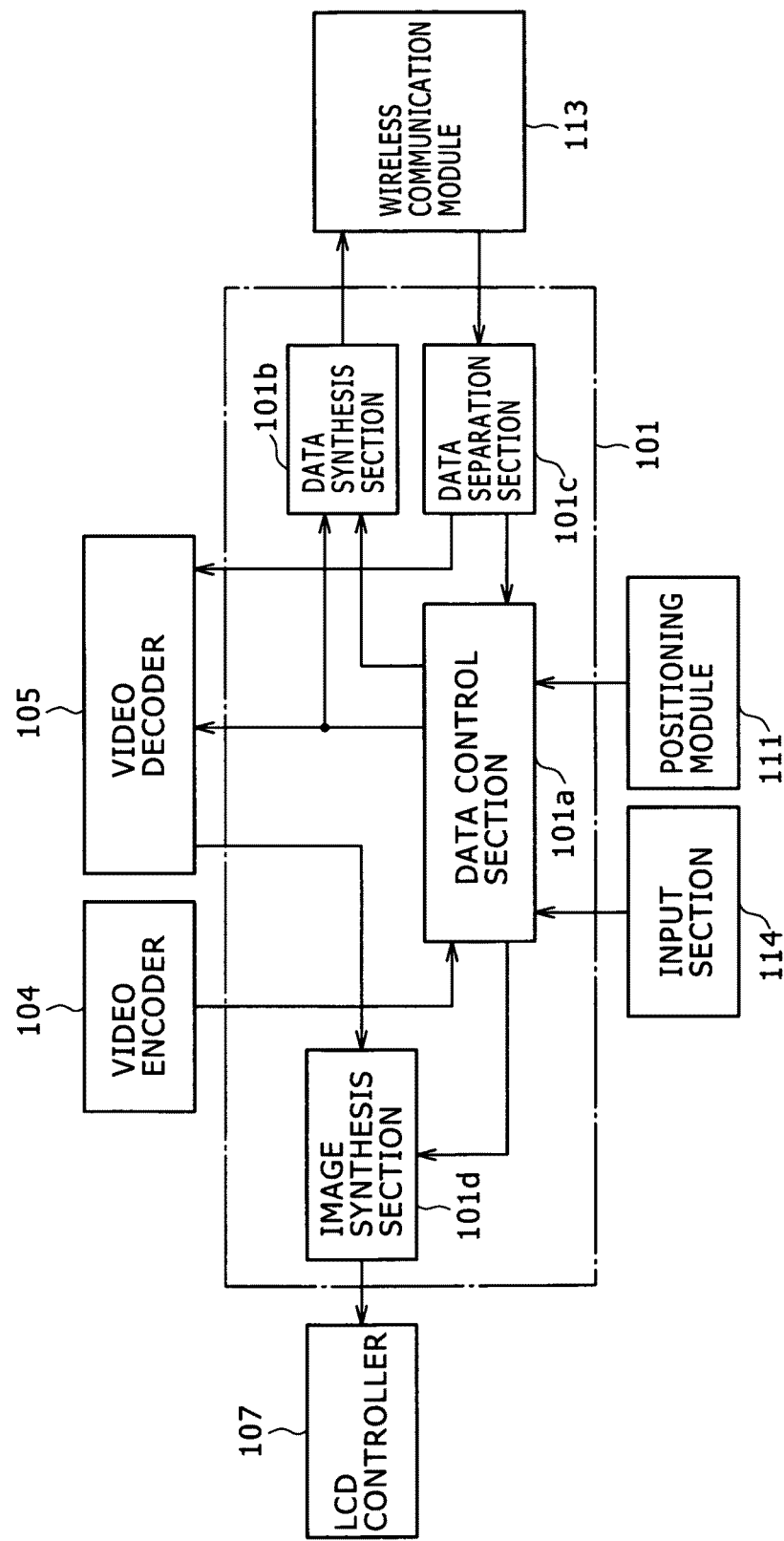
FIG. 3 is a block diagram showing functional blocks of a control section involved in sending acquired image data and displaying thumbnails.

FIG. 3 is a block diagram showing the functional blocks of the control section 101 involved in sending acquired image data and displaying thumbnails as described above. The control section 101 includes a data control section 101a, a data synthesis section 101b, a data separation section 101c, and an image synthesis section 101d.

The data control section 101a supplies the data synthesis section 101b with the outgoing bit stream coming from the video encoder 104. The data control section 101a also supplies the data synthesis section 101b with the position information acquired by the positioning module 111 as indicative of the own position. The data synthesis section 101b supplements the outgoing bit stream with the acquired position information before feeding the combination of the position information with the bit stream to the wireless communication module 113.

The data separation section 101c separates the position information-bit stream combination into the outgoing bit stream and the position information, and sends the bit stream to the video decoder 105 and the position information as well as the camera ID to the data control section 101a. The data separation section 101c also supplies the data control section 101a with the directive message that was received by the wireless communication module 113.

Based on the position information obtained by the positioning module 111, the data control section 101a reads from the ROM the map data covering illustratively the neighborhood of the own camera 100. The data control section 101a then derives map display data from the retrieved map data. Given the position information and camera ID from the data separation section 101c, the data control section 101a generates icon display data constituting icons indicative of the configured cameras in their positions defined by their position information on the map derived from the map display data. If the directive message supplied by the data separation section 101c is found to be destined for the own camera 100, then the data control section 101a generates message display data (i.e., text data) forming the directive message to be displayed.

The image synthesis section 101d proceeds to merge the thumbnail display data generated by the video decoder 105 about the configured cameras, with the map display data, icon display data, and message display data generated by the data control section 101a, into composite image data for displaying thumbnails, a map, icons, and a directive message. The composite image data thus generated is forwarded from the image synthesis section 101d to the LCD controller 107.

Figure 4:
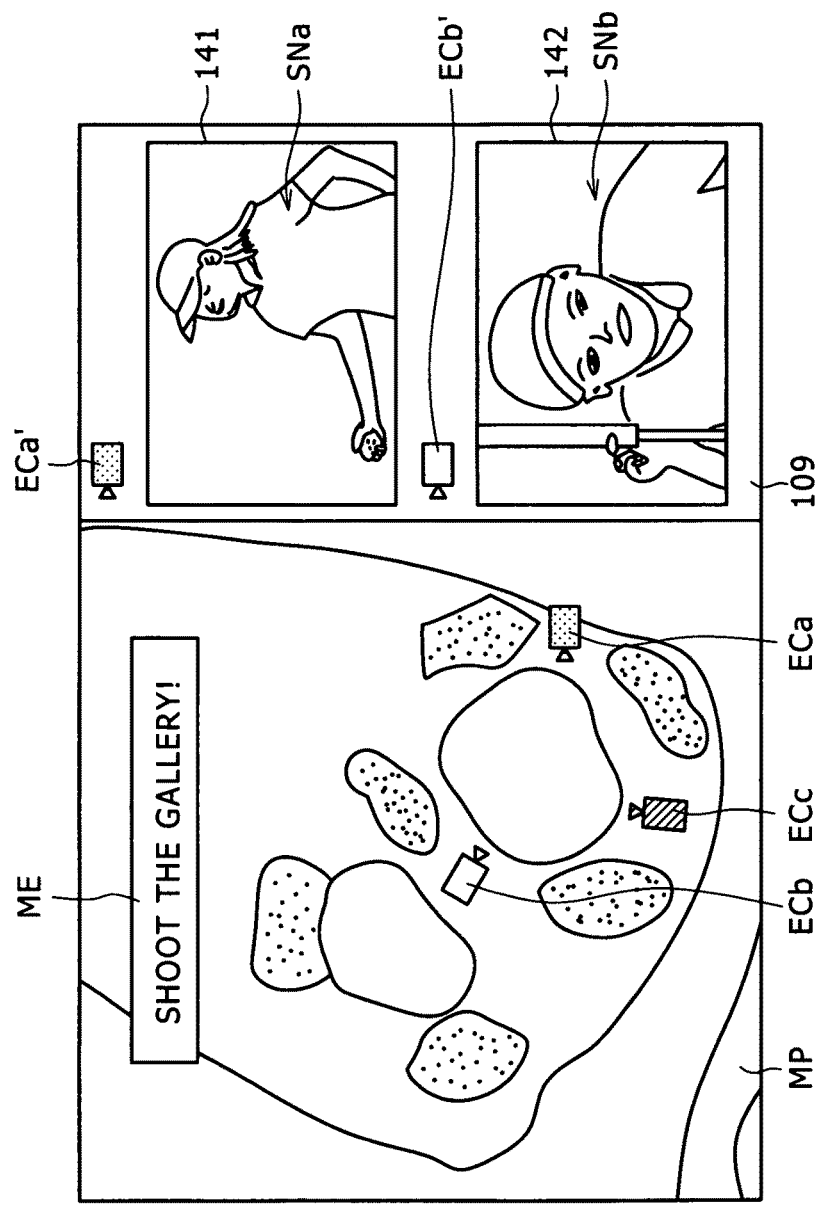
FIG. 4 is a schematic view showing a typical LCD screen displaying thumbnails, a map, icons, and a directive message.

FIG. 4 shows a typical screen display on the LCD 108. The screen display appears illustratively on the camera 100c constituting part of the camera system 10A in FIG. 1. The right-hand side of the screen on the LCD 108 is set aside for a thumbnail display area that includes two thumbnail display fields 141 and 142. The thumbnail display fields 141 and 142 display thumbnails SNa and SNb from the cameras 100a and 100b, respectively.

The screen display example above indicates in the thumbnail display fields 141 and 142 the thumbnails that allow the user to verify what is being imaged by the other cameras 100a and 100b. The image being taken by the own camera 100c is verified by viewing the image shown on a finder (not shown in FIG. 2). As will be discussed later in detail, the displayed thumbnails may be changed in the thumbnail display fields 141 and 142 by the user's operations. It is also possible to have the thumbnail of the own camera 100c displayed in one of the thumbnail display fields 141 and 142.

The left-hand side of the screen on the LCD 108 is appropriated for a map display area. The map display area displays a map MP covering the neighborhood of the cameras 100a, 100b and 100c. On the map MP are shown icons ECa, ECb and ECc indicating the positions of the cameras 100a, 100b and 100c, respectively. The icons may be typically distinguished from one another by color and/or by pattern.

In positions corresponding to the thumbnail display fields 141 and 142 appear icons ECa' and ECb' similar to the icons ECa and ECb displayed on the map MP as indicative of the cameras 100a and 100b associated with the thumbnails SNa and SNb displayed in the thumbnail display fields 141 and 142. This setup clearly indicates the correspondence between the thumbnails SNa and SNb in the thumbnail display fields 141 and 142 on the one hand, and the cameras associated with the thumbnails and shown positioned on the map on the other hand.

A directive message ME is displayed on the map MP. This directive message ME has been sent from the camera 100a operated by the director.

Figure 5:
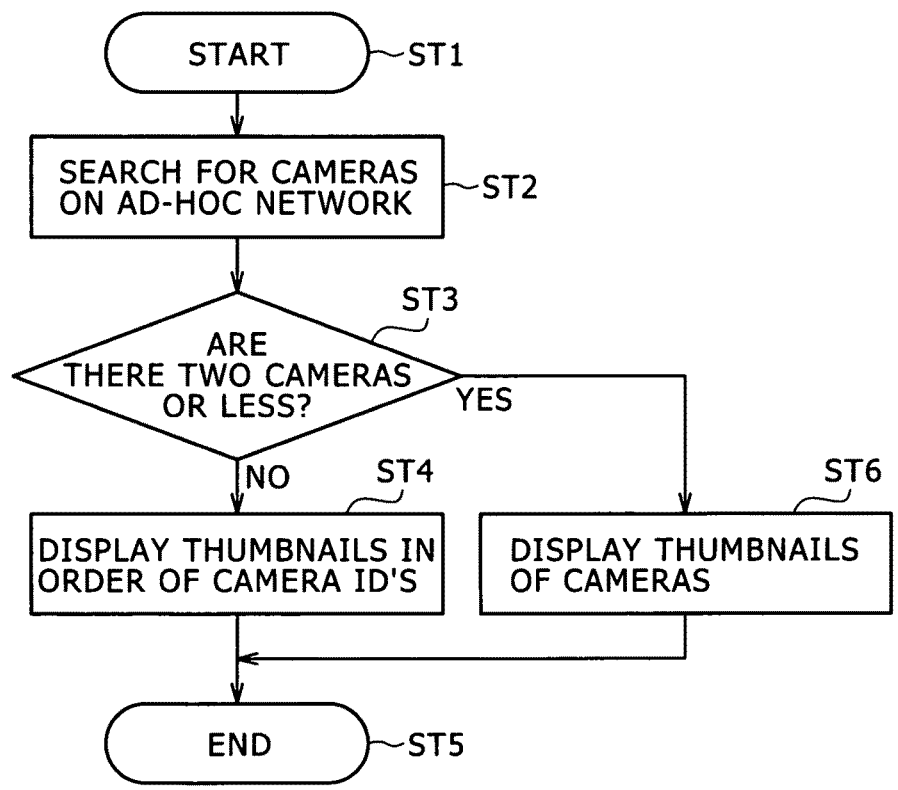
FIG. 5 is a flowchart of steps in which to display thumbnails when cameras are started up.

How thumbnails are displayed upon startup of cameras will now be described in reference to the flowchart of FIG. 5.

The control section 101 starts its control process in step ST1 and then goes to step ST2. In step ST2, the control section 101 searches for cameras (imaging apparatuses) on the wireless network (ad-hoc network). In step ST3, the control section 101 checks to determine if there are two cameras or less on the network.

If three or more cameras are found to exist on the network in step ST3, then the control section 101 goes to step ST4 and displays two thumbnails in the thumbnail display fields 141 and 142 in ascending order of camera ID's. In step ST5, the control section 101 terminates the control process. If there are two cameras or less on the network, then the control section 101 goes from step ST3 to step ST6. In step ST6, the control section 101 displays the thumbnail(s) of the configured camera(s) before terminating the control process in step ST5.

Figure 6:
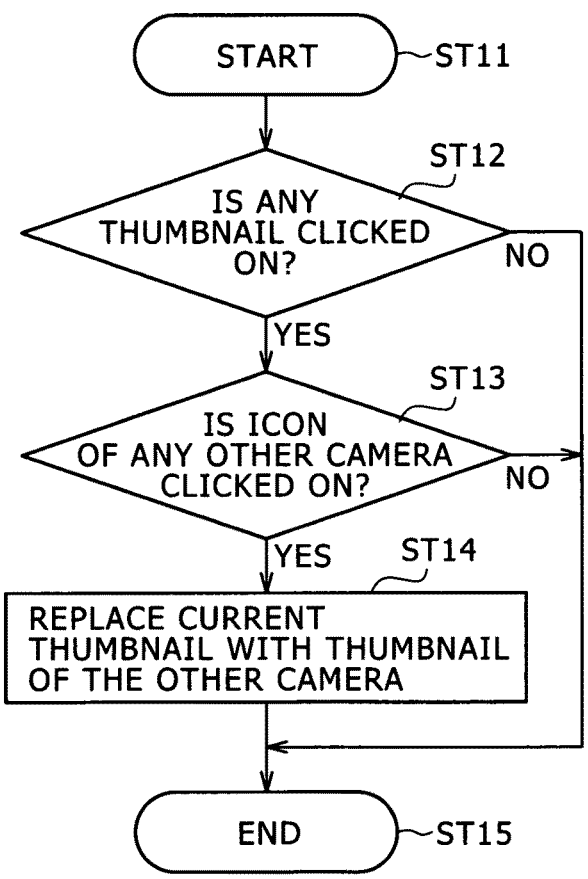
FIG. 6 is a flowchart of steps in which to change thumbnails while cameras are being used.

How thumbnails are changed while the cameras are being used will now be described in reference to the flowchart of FIG. 6.

The control section 101 starts its control process in step ST11 and goes to step ST12. In step ST12, the control section 101 checks to determine if any thumbnail is clicked on using fingertips, a stylus or the like. If a thumbnail is found clicked on in step ST12, then step ST13 is reached. In step ST13, the control section 101 checks to determine if the icon of some other camera is clicked on.

Figure 7:
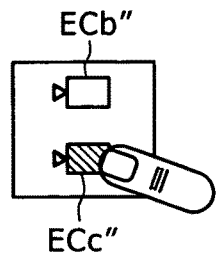
FIG. 7 is a schematic view illustrating the user's operations for changing displayed thumbnails in thumbnail display fields.

More specifically, clicking on a thumbnail causes the icons of the other cameras to appear on that thumbnail as shown in FIG. 7. The example of FIG. 7 shows that when the thumbnail SNa is clicked on, the icons ECb" and ECc" of the other cameras 100b and 100c are displayed on that thumbnail SNa. In FIG. 7, the icon ECc" is shown clicked on by fingertips.

If the icon of some other camera is clicked on in step ST13, then step ST14 is reached. In step ST14, the control section 101 replaces the current thumbnail in the thumbnail display field with the thumbnail of the other camera corresponding to the clicked icon. In step ST15, the control section 101 terminates the control process.

If no thumbnail is clicked on in step ST12 or if a spot outside the icon of some other camera is clicked (i.e., not the icon itself) in step ST13, then the control section 101 goes immediately to step ST15 and terminates the control process. While the cameras are being used, the control section 101 repeats the control process shown in FIG. 6.

Figure 8:
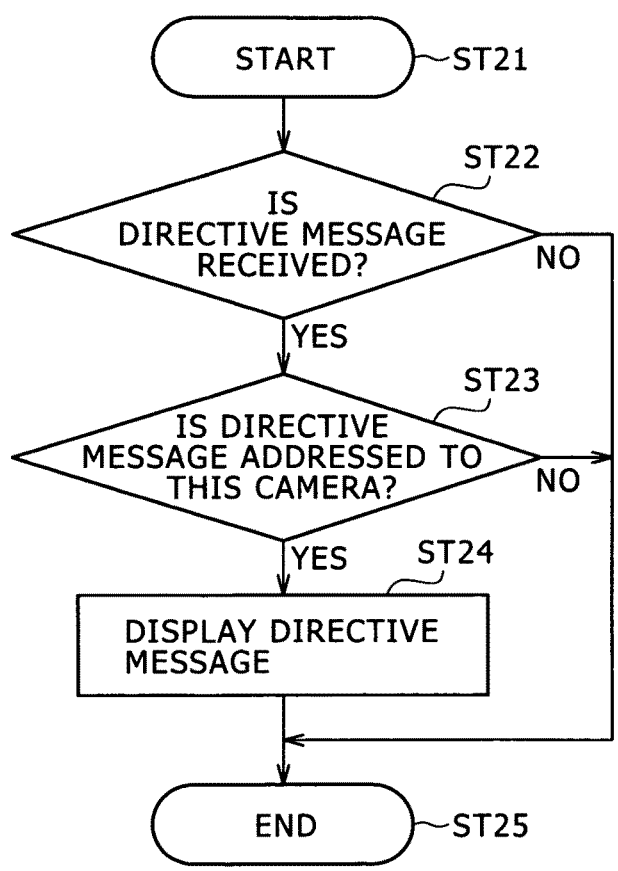
FIG. 8 is a flowchart of steps in which to display a directive message.

How a directive message is displayed will now be described in reference to the flowchart of FIG. 8.

In step ST21, the control section 101 starts its control process. In step ST22, the control section 101 checks to determine if the wireless communication module 113 is receiving a directive message.

If the directive message is found being received in step ST22, then step ST23 is reached. In step ST23, the control section 101 checks to determine if the directive message is destined for the own camera. The check in step ST23 is carried out by verifying the camera ID which is attached to the directive message and which identifies the destination camera.

If the directive message is found to be destined for the own camera, then step ST24 is reached. In step ST24, the control section 101 generates message display data (i.e., text data) for displaying the directive message and causes the LCD 108 to display on its screen the directive message ME generated (see FIG. 4). Thereafter, the control section 101 goes to step ST25 and terminates the control process.

If the directive message is not found to be received in step ST22 or if the directive message is not found destined for the own camera in step ST23, then the control section 101 goes immediately to step ST25 and terminates the control process. While the cameras are being used, the control section 101 repeats the control process of FIG. 8.

Figure 9:
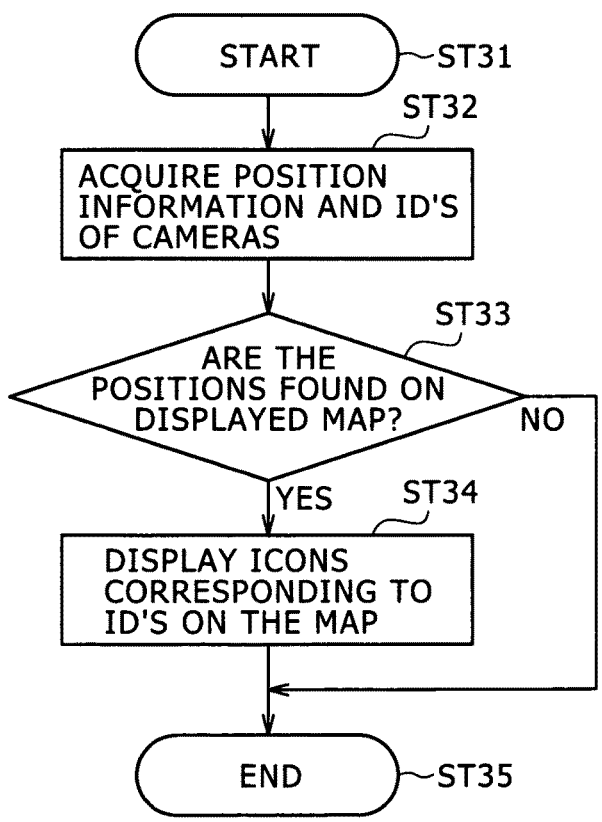
FIG. 9 is a flowchart of steps in which to display icons.

How icons are displayed will now be described in reference to the flowchart of FIG. 9.

In step ST31, the control section 101 starts its control process. In step ST32, the control section 101 acquires the position information and camera ID's of the cameras connected to the wireless network along with the position information and camera ID of the own camera. In step ST33, the control section 101 checks to determine if the positions represented by the position information about the connected cameras are on the map MP being displayed.

If the positions are found on the map MP, then step ST34 is reached. In step ST34, the control section generates icon display data for causing the LCD 108 to display on its screen the icons (see FIG. 4) which correspond to the ID's of the cameras in question and which indicate the identified cameras in their positions on the map MP. Thereafter, the control section 101 goes to step ST35 and terminates the control process. If the positions are not found on the map MP in step ST33, then the control section 101 immediately reaches step ST35 and terminates the control process.

The control section 101 carries out steps ST33 and ST34 for each of the cameras configured. While the cameras are being used, the control section 101 repeats the control process of FIG. 9. It follows that as the cameras change their positions in the field, the displayed positions on the map change accordingly.

Figure 10:
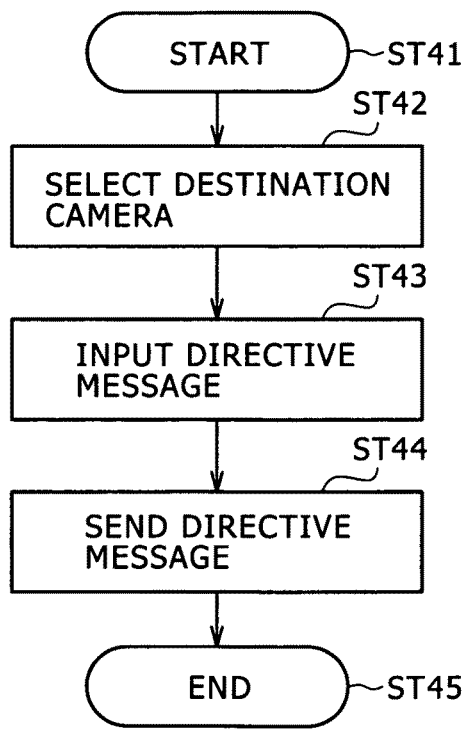
FIG. 10 is a flowchart of steps in which to send a directive message.

How a directive message is transmitted will now be described in reference to the flowchart of FIG. 10.

In step ST41, the director (i.e., user) operates the input section 114 to initiate a directive message sending process. In step ST42, the director selects the destination camera to which to send the message. At this point, the director can select the desired camera by clicking on the camera's icon using fingertips, a stylus or the like on the map MP displayed on the screen of the LCD 108.

In step ST43, the director inputs the directive message by operating character keys, not shown, on the input section 114. In step ST44, the director sends the directive message to the destination camera by operating a SEND key, not shown, on the input section 114. Alternatively, the character keys and SEND key may be displayed on the LCD 108 to let the director input the directive message and send the input message by operation of the touch-sensitive panel 109 mounted on the display. Step ST44 is followed by step ST45 in which the directive message sending process is terminated.

In the camera system 10A shown in FIG. 1, the LCD 108 of each camera 100 (100a through 100c) displays the thumbnails derived from the acquired image data of the other cameras, together with the icons indicative of the cameras as they are positioned on the map displayed on the LCD 108. This allows illustratively the director to verify easily the positions of the configured cameras and the images being taken thereby.

In the camera system 10A of FIG. 1, if the number of the cameras constituting the wireless network is larger than the number of the thumbnail display fields 141 and 142 on the LCD 108, then the thumbnail display fields 141 and 142 are arranged to display the thumbnails corresponding to the cameras selected by the user (i.e., director). That is, the camera system 10A can readily handle cases where the number of cameras is larger than the number of thumbnail display fields 141 and 142.

In the camera system 10A of FIG. 1, each camera 100 can send directive messages to another camera configured. This eliminates the need for the camera operators to resort to mobile phones and/or walkie-talkies for coordination between the cameras.

Figure 11:
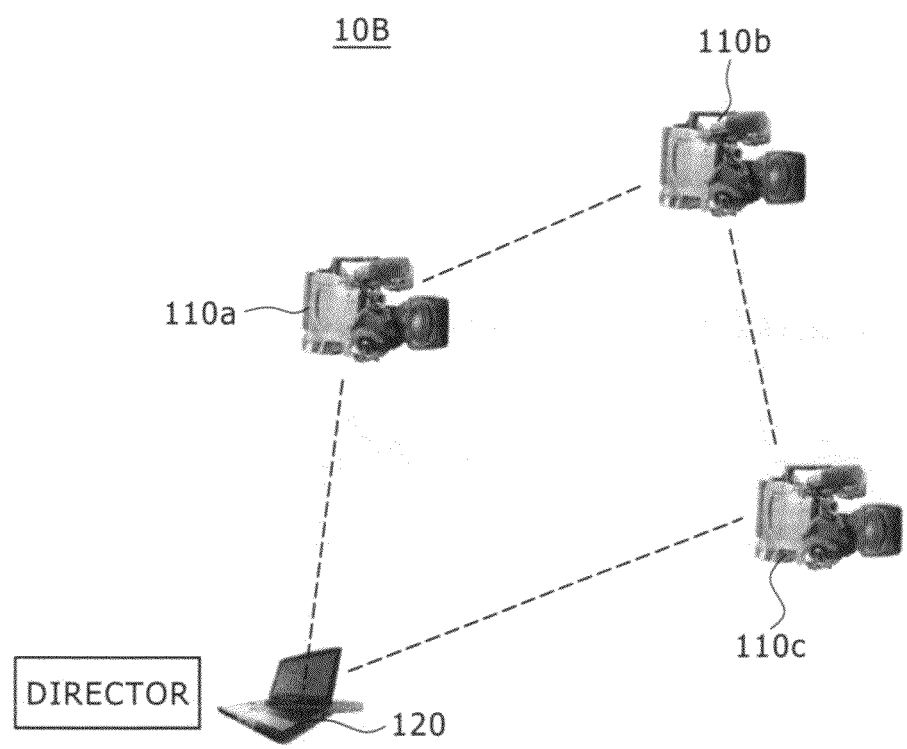
FIG. 11 is a schematic view showing a typical configuration of a camera system practiced as another embodiment of the present invention.

Another embodiment of the present invention will now be described in reference to FIG. 11. FIG. 11 schematically shows a typical configuration of a camera system 10B practiced as an alternative embodiment of the present invention. Of the reference numerals in FIG. 11, those already used in FIG. 1 designate like or corresponding parts, and their detailed descriptions will be omitted where redundant.

The camera system 10B is made up of three cameras (imaging apparatuses) 110a, 110b and 110c and a personal computer 120 interconnected via a wireless ad-hoc network.

The cameras 110a, 110b and 110c each have the same structure as that of the cameras 100a, 100b and 100c (see FIG. 2) in the camera system 10A of FIG. 1 and thus will not be discussed further.

Figure 12:
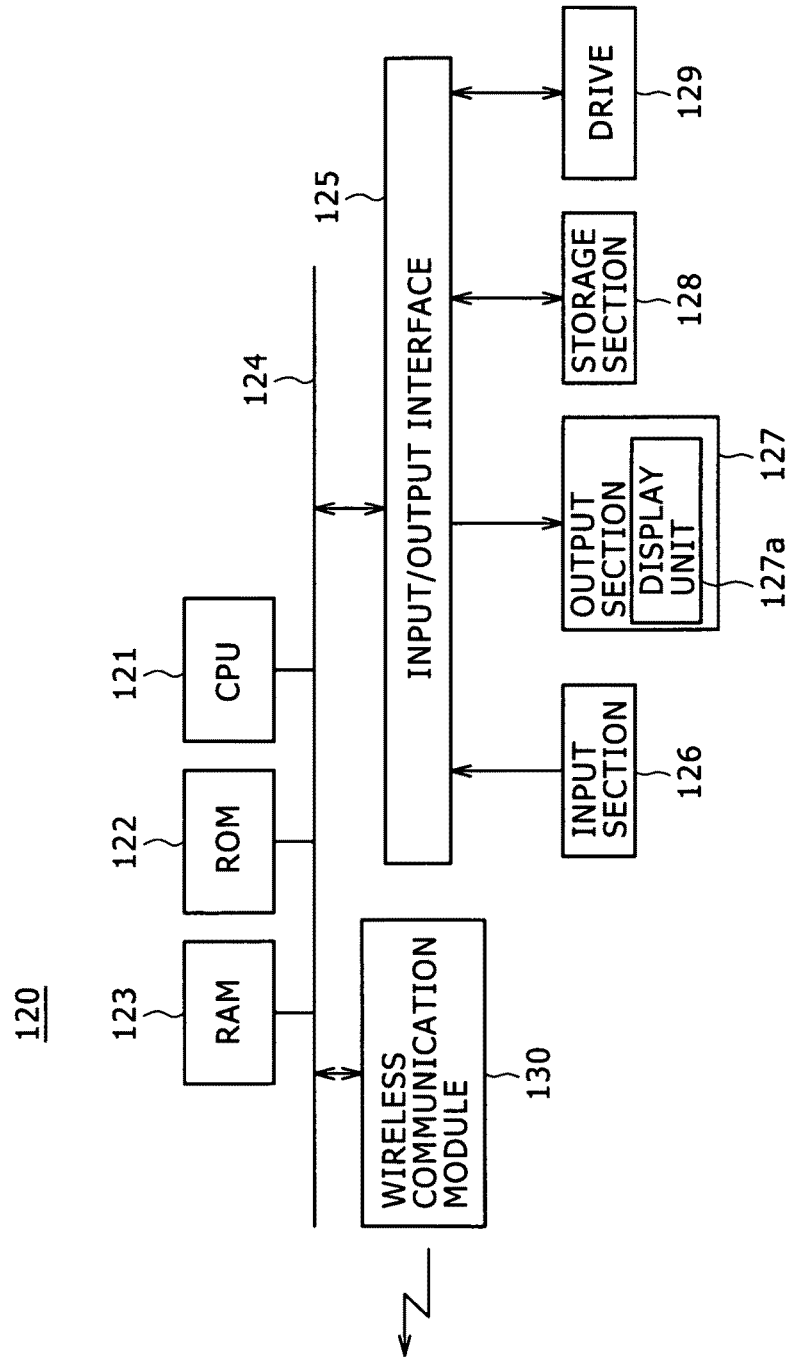
FIG. 12 is a block diagram showing a typical structure of a personal computer.

FIG. 12 is a block diagram showing a typical structure of the personal computer 120.

The personal computer 120 includes a CPU (central processing unit) 121, a ROM (read only memory) 122, a RAM (random access memory) 123, a bus 124, an input/output interface 125, an input section 126, an output section 127, a storage section 128, a drive 129, and a wireless communication module 130.

In the personal computer 120, the CPU 121, ROM 122 and RAM 123 are interconnected via a bus 124. The bus 124 is also connected to the input/output interface 125. The input/output interface 125 is connected to the input section 126, output section 127, storage section 128, and drive 129.

The input section 126 is typically made up of a keyboard, a mouse and a microphone. The output section 127 is generally formed by a display unit 127a and speakers. The storage section 128 is constituted illustratively by a hard disk drive (HDD) or by a nonvolatile memory. The drive 129 serves to drive removable media such as magnetic disks, optical disks, magneto-optical disks, or memory cards.

The wireless communication module 130 is also connected to the bus 124. The wireless communication module 130 is identical to the wireless communication module 113 of the above-described camera 100. That is, the wireless communication module 130 is typically constituted by an antenna and an RF transceiver for signal transmission and reception using a modulation method such as OFDM (Orthogonal Frequency Division Multiplexing), as well as by processors for handling baseband processing and for interfacing with the CPU 121. Under a communication protocol controlled by the CPU 121, the wireless communication module 130 communicates wirelessly with the other cameras configured.

In the personal computer 120 shown in FIG. 12, the CPU 121 loads preinstalled programs from the storage section 128 into the RAM 123 for execution, the retrieved programs being forwarded to the memory through the input/output interface 125 and bus 124. The CPU 121 then executes the loaded programs to carry out a series of processes to be discussed below.

Explained below are typical processes performed by the personal computer 120 of FIG. 12 for displaying thumbnails based on the acquired image data received from the camera 110 (110a through 110c) and for sending a directive message to the camera 110.

Described first is the process for displaying thumbnails representative of the acquired image data received from the camera 110 (110a, 110b, 110c).

An outgoing bit stream combined with position information is sent by the camera 110 onto the wireless network and received by the wireless communication module 130. The received outgoing bit stream is forwarded to the CPU 121 by way of the bus 124. The CPU 121 separates the bit stream-position information combination into the bit stream and the attached position information. The CPU 121 then expansion-decodes the bit stream in order to generate thumbnail display data. This is how the thumbnail display data is generated, by the CPU 121, with regard to each of the cameras connected to the wireless network.

Based on the position information separated as described above, the CPU 121 reads illustratively from the storage section 128 the map data covering the neighborhood of the cameras configured and creates map display data from the retrieved map data. Also based on the separated position information, the CPU 121 creates icon display data for displaying icons indicative of the positions of the configured cameras on the map displayed using the above-mentioned map display data.

The CPU 121 proceeds to merge the thumbnail display data, map display data, and icon display data into composite image data that is forwarded to the output section 127 via the bus 124 and input/output interface 125. In turn, the output section 127 causes the display unit 127a to display images derived from the composite image data. In this case, the display unit 127a displays thumbnails representative of the acquired image data from the connected cameras, along with a map which covers the neighborhood of the cameras and which shows icons indicative of the cameras where they are positioned.

How a directive message is sent to the camera 110 will now be described.

The directive message is input by the user (i.e., director) operating the input section 126. The directive message thus input is forwarded from the input section 126 to the CPU 121 through the input/output interface 125 and bus 124. From the CPU 121, the directive message is fed to the wireless communication module 130 via the bus 124. The wireless communication module 130 transmits the directive message to the camera 110 selected by the user (director).

Figure 13:
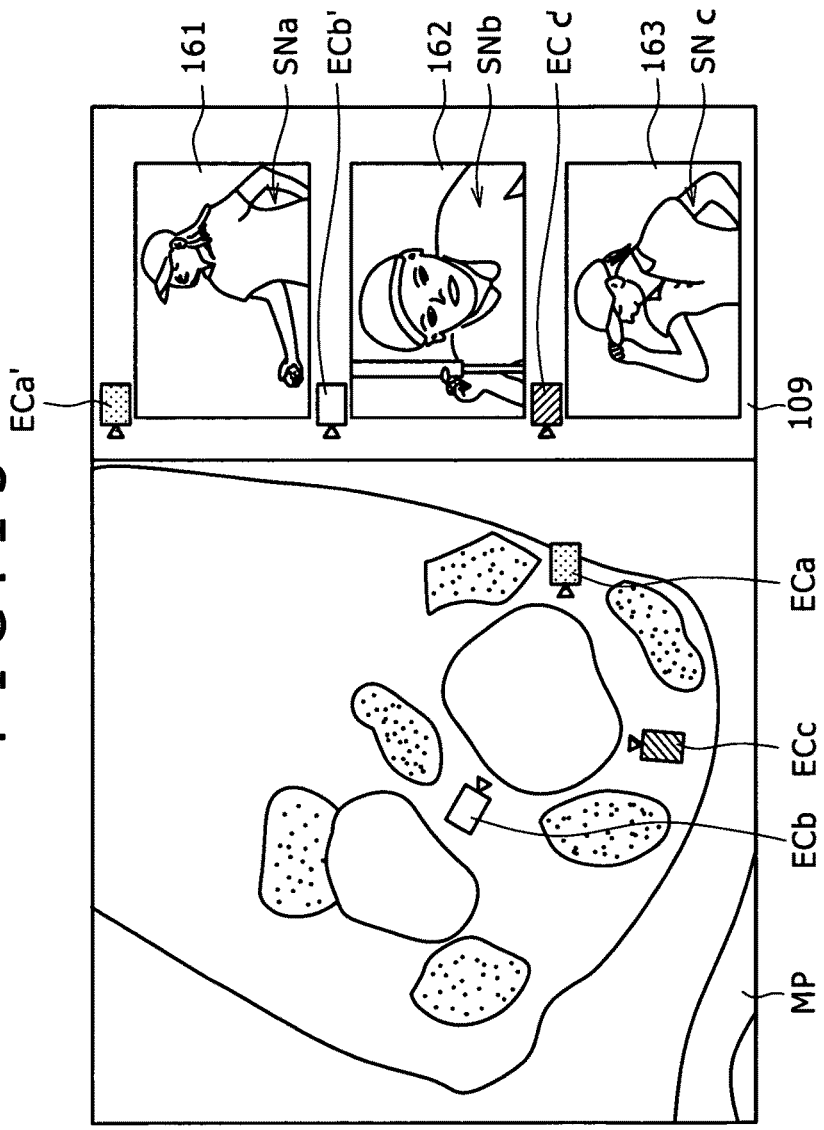
FIG. 13 is a schematic view showing a typical display screen that displays thumbnails, a map, and icons.

FIG. 13 schematically shows a typical display screen on the display unit 127a. The right-hand side of the screen on the display unit 127a is used as a thumbnail display area that includes three thumbnail display fields 161, 162 and 163. The thumbnail display fields 161, 162 and 163 display thumbnails SNa, SNb and SNc from the cameras 110a, 110b and 110c, respectively.

The screen display example above indicates in the thumbnail display fields 161, 162 and 163 the thumbnails SNa, SNb and SNc that allow the user to verify what is being imaged by the other cameras 110a, 110b and 110c. As will be discussed later in detail, the displayed thumbnails may be changed in the thumbnail display fields 161, 162 and 163 by the user's operations.

The left-hand side of the screen on the display unit 127a is appropriated for a map display area. The map display area displays a map MP covering the neighborhood of the cameras 110a, 110b and 110c. On the map MP are shown icons ECa, ECb and ECc indicating the positions of the cameras 110a, 110b and 110c, respectively. The icons may be typically distinguished from one another by color and/or by pattern.

In positions corresponding to the thumbnail display fields 161, 162 and 163 appear icons ECa', ECb' and ECc' similar to the icons ECa, ECb and ECc displayed on the map MP as indicative of the cameras 110a, 110b and 110c associated with the thumbnails SNa, SNb and SNc displayed in the thumbnail display fields 161, 162 and 163. This setup clearly indicates the correspondence between the thumbnails SNa, SNb and SNc in the thumbnail display fields 161, 162 and 163 on the one hand, and the cameras associated with the thumbnails and shown positioned on the map on the other hand.

Figure 14:
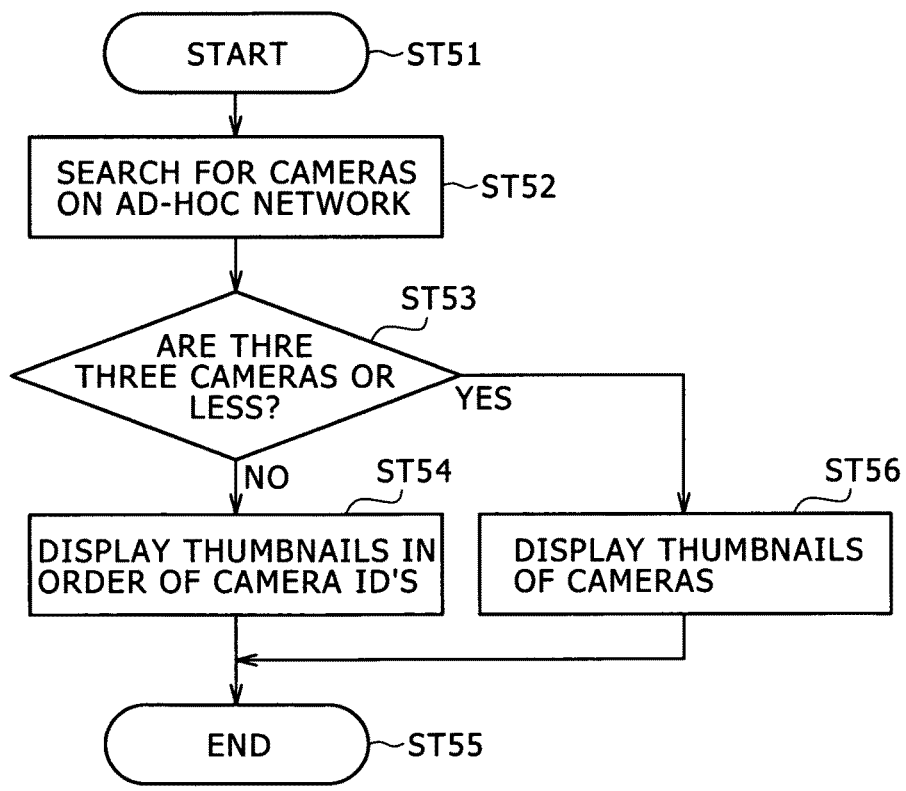
FIG. 14 is a flowchart of steps in which to display thumbnails upon startup of the personal computer.

Described below in reference to the flowchart of FIG. 14 is how thumbnails are displayed upon startup of the personal computer 120.

In step ST51, the CPU 121 starts its control process. In step ST52, the CPU 121 searches for cameras (imaging apparatuses) on the wireless network (ad-hoc network). In step ST53, the CPU 121 checks to determine if there are three cameras or less on the network.

If four or more cameras are found to exist on the network in step ST53, then the CPU 121 goes to step ST54 and displays three thumbnails in the thumbnail display fields 161, 162 and 163 in ascending order of camera ID's. In step ST55, the CPU 121 terminates the control process. If in step ST53 three cameras or less are found to exist on the network, then the CPU 121 goes to step ST56. In step ST56, the CPU 121 displays the thumbnail(s) of the configured camera(s) before terminating the control process in step ST55.

Figure 15:
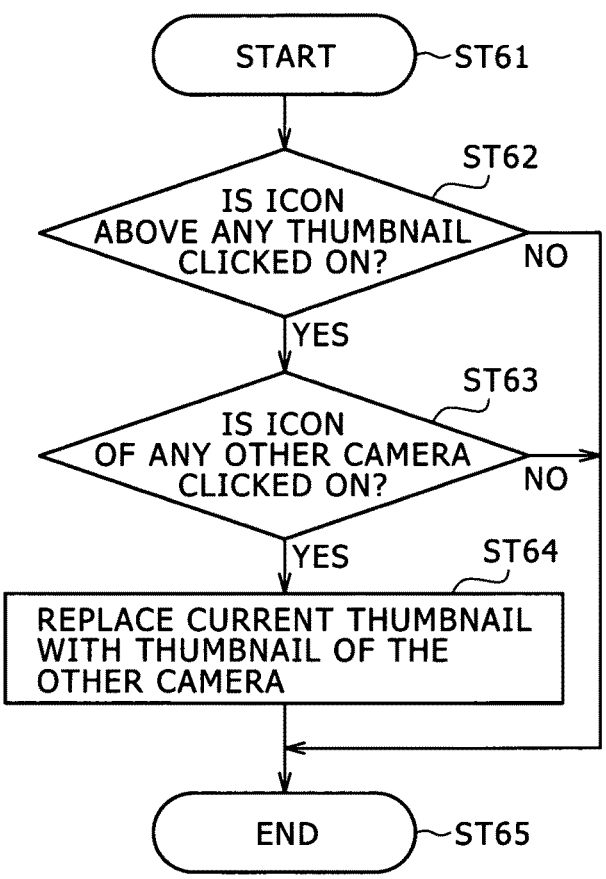
FIG. 15 is a flowchart of steps in which to change thumbnails while the personal computer is being used.

Described below in reference to the flowchart of FIG. 15 is how thumbnails are changed while the personal computer 120 is being used.

The CPU 121 starts its control process in step ST61 and goes to step ST62. In step ST62, the CPU 121 checks to determine if the icon (see ECa', ECb' and ECc' in FIG. 13) on any thumbnail is clicked on. If the icon on a given thumbnail is found clicked on in step ST62, then step ST63 is reached. In step ST63, the CPU 121 checks to determine if the icon of some other camera is clicked on.

Figure 16:
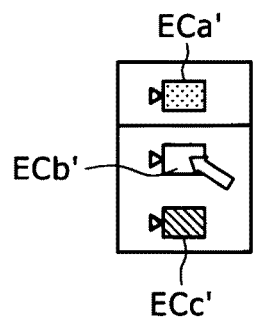
FIG. 16 is a schematic view illustrating the user's operations for changing displayed thumbnails in the thumbnail display fields.

More specifically, clicking on a thumbnail in step ST62 causes the icons of the other cameras to appear in a pull-down menu under the clicked thumbnail as shown in FIG. 16. The example of FIG. 16 shows that when the icon ECa' on the thumbnail SNa of the camera 110a is clicked on, the icons ECb' and ECc' of the other cameras 110b and 110c are displayed in a pull-down menu. In FIG. 16, the icon ECb' is pointed to by a cursor and clicked on.

If the icon of some other camera is clicked on in step ST63, then step ST64 is reached. In step ST64, the CPU 121 replaces the thumbnail in the thumbnail display field corresponding to the icon clicked in step ST62, with the thumbnail of the other camera corresponding to the icon clicked on in step ST63. In step ST65, the CPU 121 terminates the control process.

If no thumbnail is clicked on in step ST62 or if a spot outside the icon of some other camera is clicked (i.e., not the icon itself) in step ST63, then the CPU 121 goes immediately to step ST65 and terminates the control process. While the personal computer 120 is being used, the CPU 121 repeats the control process shown in FIG. 15.

Figure 17:
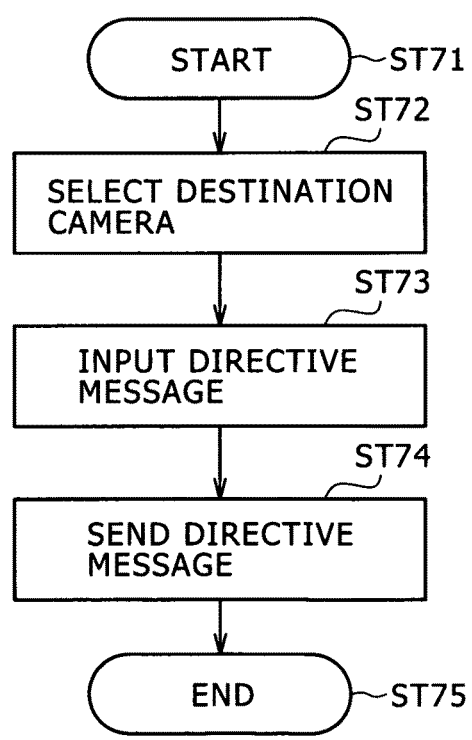
FIG. 17 is a flowchart of steps in which to send a directive message.

Described in reference to the flowchart of FIG. 17 is how a directive message is transmitted.

Figure 18A:
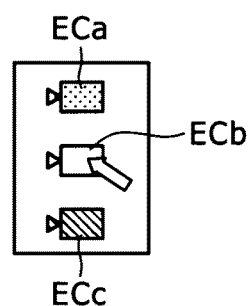
FIGS. 18A and 18B are schematic views illustrating the user's operations for sending a directive message.

In step ST71, the director (i.e., user) operates the input section 126 to initiate a directive message sending process. In step ST72, the director selects the destination camera to which to send the message. Illustratively, the director can easily select the desired destination camera by clicking on one of the icons ECa, ECb and ECc indicating the cameras and displayed as shown in FIG. 18A.

In step ST73, the director inputs the directive message by operating a keyboard or the like of the input section 126. For example, when the directive message sending process is started, the director inputs a suitable directive message so that the message will be displayed in a message input field 171 on the display unit 127a as illustrated in FIG. 18B.

Figure 18B:
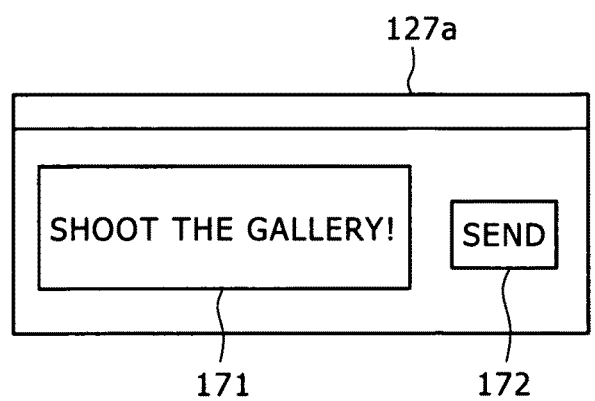

In step ST74, the director sends the directive message to the destination camera by clicking on a SEND key 172 appearing on the display unit 127a as shown in FIG. 18B. Step ST74 is followed by step ST75 in which the directive message sending process is terminated.

Figure 19:
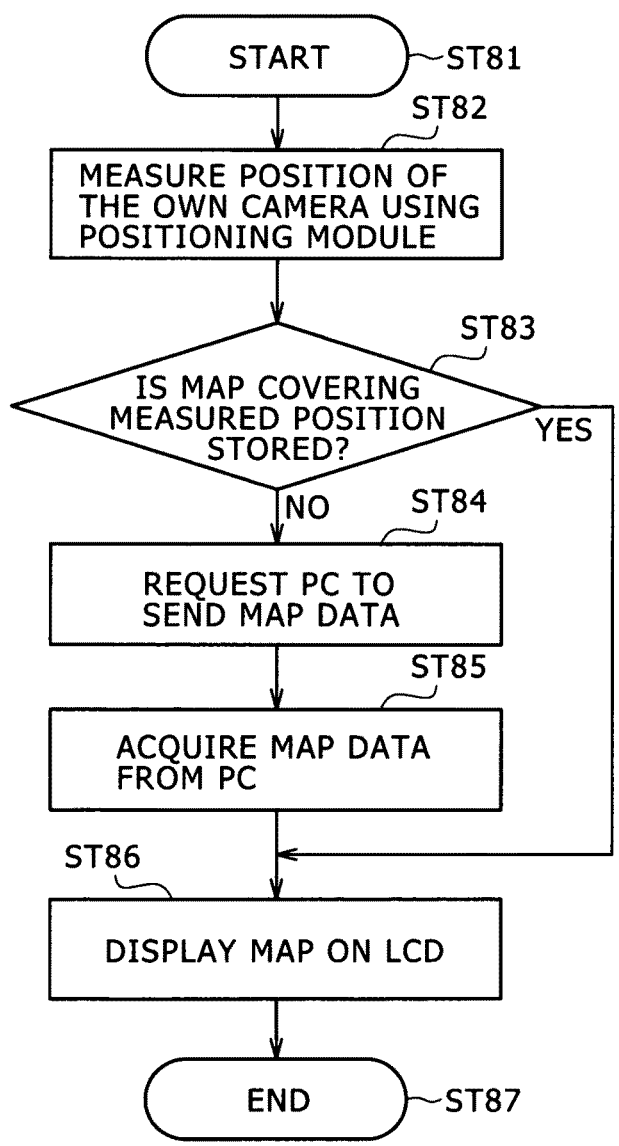
FIG. 19 is a flowchart of steps in which to display a map on a camera.

Described below in reference to the flowchart of FIG. 19 is how a map of the camera 110 (110a, 110b, 110c) is displayed by the camera system 10B of FIG. 11.

In step ST81, the control section 101 starts its control process. In step ST82, the control section 101 measures the position of the own camera using the positioning module 111.

In step ST83, the control section 101 checks to determine if any map covering the neighborhood of the position being measured is stored in an internal memory such as a flash ROM. If no such map is found to exist in step ST83, then step ST84 is reached. In step ST84, the control section 101 requests the personal computer 120 to send map data about the position in question. In step ST85, the control section 101 acquires the map data from the personal computer 120. In this case, the personal computer 120 constitutes a database containing the map data.

In step ST86, the control section 101 causes the LCD 108 to display a map covering the target position on the basis of the map data acquired from the personal computer 120. In step ST87, the control section 101 terminates the control process. If in step ST83 relevant map data covering the position of interest is found to be stored in the internal memory, then the control section 101 goes immediately to step ST86 and causes the LCD 108 to display the map covering the target position based on the stored map data. Step ST86 is followed by step ST87 in which the control section 101 terminates the control process.

The above-described arrangement is defined in that the camera 110 acquires necessary map data from the personal computer 120 merely if the map data covering the position being measured is not found in the internal memory. Because it is not desired to store superfluous data inside, the camera 110 can economize on its memory capacity.

Alternatively, a database containing map data may be set up apart from the personal computer 120. For example, a particular camera may be arranged to function as a database holding a large amount of map data. As another alternative, a server offering map data alone may be established separately.

In the camera system 10B shown in FIG. 11, the display unit 127a of the personal computer 120 displays the thumbnails derived from the acquired image data of the cameras configured, together with the icons indicative of the cameras as they are positioned on the map displayed on the display unit 127a. This allows illustratively the director operating the personal computer 120 to verify easily the positions of the configured cameras and the images being taken thereby.

In the camera system 10B of FIG. 11, if the number of the cameras constituting the wireless network is larger than the number of the thumbnail display fields 161, 162 and 163 on the display unit 127a, then the thumbnail display fields 161, 162 and 163 are arranged to display the thumbnails corresponding to the cameras selected by the user (i.e., director). In that manner, the camera system 10B can readily handle cases where the number of cameras is larger than the number of thumbnail display fields.

In the camera system 10B of FIG. 11, the personal computer 120 can send directive messages to the camera selected as the destination camera. This eliminates the need for the camera operators to utilize mobile phones and/or walkie-talkies for coordination between the cameras.

With regard to the preceding embodiment of the present invention, it was explained that all cameras are identical in structure and that thumbnails, maps and icons are displayed on the LCD 108 of each camera. Alternatively, the display function need merely be installed in the camera to be handled by the director; all other cameras may be deprived of that capability. For the preceding embodiment, it was also explained that directive messages are displayed on the LCD 108. Alternatively, directive messages may be displayed on some other display unit such as a viewfinder.

The embodiments of the present invention, when embodied illustratively as described above, allows the director (i.e., user) easily to verify the positions of the cameras (imaging apparatuses) constituting a wireless network and the images being taken by these cameras. As such, the embodiment of the invention may be applied illustratively to a camera system made up of a plurality of cameras interconnected by a wireless network.

It should be understood by those skilled in the art that various modifications, combinations, sub-combinations and alterations may occur depending on design requirements and other factor in so far as they are within the scope of the appended claims or the equivalents thereof.

What is claimed is:

1. An information display apparatus comprising:
   a wireless reception section configured to receive image data and position information acquired and sent by a plurality of imaging apparatuses constituting a wireless network;
   an image display section configured to display images;
   a positioning section configured to acquire position information by measuring the own position of said information display apparatus; and
   a display control section configured to display on said image display section thumbnails derived from the acquired image data received by said wireless reception section, a map covering the positions of said imaging apparatuses, and icons indicating said imaging apparatuses as they are positioned on said map based on said position information received by said wireless reception section,
   the map being selected by the information display apparatus based on the own position acquired by the positioning section,
   the information display apparatus being operable to receive directive messages directly from one or more of the imaging apparatuses, determine whether or not a received directive message is intended for the information display apparatus, and when the received directive message is intended for the information display apparatus, display the received directive message as superimposed on the map,
   wherein when a displayed thumbnail is selected icons corresponding to non-selected thumbnails are displayed superimposed on the selected thumbnail, and when one of the displayed icons corresponding to non-selected thumbnails is selected, display of the selected thumbnail is replaced by display of the non-selected thumbnail which corresponds to the selected one of the displayed icons.

2. The information display apparatus according to claim 1, wherein said display control section displays an icon indicating on said map the own position of said information display apparatus based on said position information acquired by said positioning section.

3. The information display apparatus according to claim 2, further comprising:
   a wireless transmission section configured to send onto said wireless network said image data acquired by an imaging section in association with said position information acquired by said positioning section.

4. The information display apparatus according to claim 2, wherein said wireless reception section receives map data covering the positions indicated by said position information acquired by said positioning section; and
   said display control section displays said map on said image display section based on said map data received by said wireless reception section.

5. The information display apparatus according to claim 1, wherein, if the number of imaging apparatuses constituting said wireless network is larger than the number of thumbnail display fields on said image display section, then said display control section causes said thumbnail display fields to display the thumbnails corresponding to the imaging apparatuses selected by a user.

6. The information display apparatus according to claim 1, wherein said display control section displays, in positions corresponding to said thumbnail display fields on said image display section, the same icons as those displayed on said map and indicative of the imaging apparatuses associated with the thumbnails indicated in said thumbnail display fields.

7. The information display apparatus according to claim 1, further comprising:
a message input section configured to allow a user to input a directive message;
a transmission destination selection section configured to allow said user to select one of said imaging apparatuses as the destination to which to send said directive message; and
a wireless transmission section configured to send said directive message input through said message input section to the imaging apparatus selected by said transmission destination selection section.

8. An information display method for use by an imaging apparatus comprising the steps of:
receiving image data and position information acquired and sent by a plurality of other imaging apparatuses constituting a wireless network;
acquiring the own position of the imaging apparatus using a positioning section of the imaging apparatus; and
displaying on an image display section of the imaging apparatus thumbnails derived from the acquired image data received in said receiving step, a map covering the positions of said other imaging apparatuses, and icons indicating said other imaging apparatuses as they are positioned on said map based on said position information received in said receiving step,
the map being selected by the information display apparatus based on the own position acquired by the positioning section,
the imaging apparatus being operable to receive directive messages directly from one or more of the other imaging apparatuses, determine whether or not a received directive message is intended for the imaging apparatus, and when the received directive message is intended for the imaging apparatus, display the received directive message as superimposed on the map,
wherein when a displayed thumbnail is selected icons corresponding to non-selected thumbnails are displayed superimposed on the selected thumbnail, and when one of the displayed icons corresponding to non-selected thumbnails is selected, display of the selected thumbnail is replaced by display of the non-selected thumbnail which corresponds to the selected one of the displayed icons.

9. An imaging apparatus for constituting part of a wireless network, said imaging apparatus comprising:
an imaging section configured to image objects and acquire image data corresponding to said objects;
a positioning section configured to acquire position information by measuring the own position of said imaging apparatus;
a wireless transmission section configured to send onto said wireless network said image data acquired by said imaging section in association with said position information acquired by said positioning section;
a wireless reception section configured to receive image data and position information acquired and sent by other imaging apparatuses constituting said wireless network;
an image display section configured to display images; and
a display control section configured to display on said image display section thumbnails derived from the acquired image data received by said wireless reception section, a map covering the position of the own imaging apparatus, and icons indicating said other imaging apparatuses and said own imaging apparatus as they are positioned on said map based on the position information received by said wireless reception section and on the position information acquired by said positioning section,
the map being selected by the imaging apparatus based on the own position acquired by the positioning section,
the imaging apparatus being operable to receive directive messages directly from one or more of the other imaging apparatuses, determine whether or not a received directive message is intended for the imaging apparatus, and when the received directive message is intended for the imaging apparatus, display the received directive message as superimposed on the map,
wherein when a displayed thumbnail is selected icons corresponding to non-selected thumbnails are displayed superimposed on the selected thumbnail, and when one of the displayed icons corresponding to non-selected thumbnails is selected, display of the selected thumbnail is replaced by display of the non-selected thumbnail which corresponds to the selected one of the displayed icons.

10. An information display apparatus comprising:
wireless reception means for receiving image data and position information acquired and sent by a plurality of imaging apparatuses constituting a wireless network;
image display means for displaying images;
positioning means for acquiring position information by measuring the own position of said information display apparatus; and
display control means for displaying on said image display means thumbnails derived from the acquired image data received by said wireless reception means, a map covering the positions of said imaging apparatuses, and icons indicating said imaging apparatuses as they are positioned on said map based on said position information received by said wireless reception means,
the map being selected by the information display apparatus based on the own position acquired by the positioning means,
the information display apparatus being operable to receive directive messages directly from one or more of the imaging apparatuses, determine whether or not a received directive message is intended for the information display apparatus, and when the received directive message is intended for the information display apparatus, display the received directive message as superimposed on the map,
wherein when a displayed thumbnail is selected icons corresponding to non-selected thumbnails are displayed superimposed on the selected thumbnail, and when one of the displayed icons corresponding to non-selected thumbnails is selected, display of the selected thumbnail is replaced by display of the non-selected thumbnail which corresponds to the selected one of the displayed icons.

11. An imaging apparatus for constituting part of a wireless network, said imaging apparatus comprising:
imaging means for imaging objects and acquiring image data corresponding to said objects;
positioning means for acquiring position information by measuring the own position of said imaging apparatus; and wireless transmission means for sending onto said wireless network said image data acquired by said imaging means in association with said position information acquired by said positioning means;

a wireless reception means for receiving image data and position information acquired and sent by other imaging apparatuses constituting said wireless network;

an image display means for displaying images; and a display control means for displaying on said image display means thumbnails derived from the acquired image data received by said wireless reception means, a map covering the position of the own imaging apparatus, and icons indicating said other imaging apparatuses and said own imaging apparatus as they are positioned on said map based on the position information received by said wireless reception means and on the position information acquired by said positioning means, the map being selected by the imaging apparatus based on the own position acquired by the positioning means, the imaging apparatus being operable to receive directive messages directly from one or more of the other imaging apparatuses, determine whether or not a received directive message is intended for the imaging apparatus, and when the received directive message is intended for the imaging apparatus, display the received directive message as superimposed on the map, wherein when a displayed thumbnail is selected icons corresponding to non-selected thumbnails are displayed superimposed on the selected thumbnail, and when one of the displayed icons corresponding to non-selected thumbnails is selected, display of the selected thumbnail is replaced by display of the non-selected thumbnail which corresponds to the selected one of the displayed icons.

* * * * *